US012669982B2

(12) United States Patent
Ma et al.

(10) Patent No.: US 12,669,982 B2
(45) Date of Patent: Jun. 30, 2026

(54) SCRIPT GENERATION METHOD, ELECTRONIC DEVICE AND STORAGE MEDIUM

(71) Applicant: BEIJING ZITIAO NETWORK TECHNOLOGY CO., LTD., Beijing (CN)

(72) Inventors: Ruifeng Ma, Beijing (CN); Weifeng Huang, Beijing (CN); Xiaobo Huang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 211 days.

(21) Appl. No.: 18/567,556

(22) PCT Filed: May 10, 2022

(86) PCT No.: PCT/CN2022/091863
§ 371 (c)(1),
(2) Date: Dec. 6, 2023

(87) PCT Pub. No.: WO2023/273621
PCT Pub. Date: Jan. 5, 2023

(65) Prior Publication Data
US 2024/0319967 A1 Sep. 26, 2024

(30) Foreign Application Priority Data
Jun. 29, 2021 (CN) .......................... 202110729951.2

(51) Int. Cl.
*G06F 8/30* (2018.01)

(52) U.S. Cl.
CPC ..................................... *G06F 8/30* (2013.01)

(58) Field of Classification Search
CPC ....................................................... G06F 8/30
(Continued)

(56) References Cited

U.S. PATENT DOCUMENTS 6,714,219 B2 * 3/2004 Lindhorst ................. G06F 8/34
715/769
8,510,709 B2 * 8/2013 Bordelon .................. G06F 8/34
717/109
(Continued)

FOREIGN PATENT DOCUMENTS

CN 102227225 A 10/2011
CN 106178118 A 12/2016
(Continued)

OTHER PUBLICATIONS

Kuang et al, An Automation Script Generation Technique for the Smart Home, IEEE, pp. 1-34 (Year: 2023).*
(Continued)

*Primary Examiner* — Anil Khatri
(74) *Attorney, Agent, or Firm* — Astute IP Law Group

(57) ABSTRACT

A script generation method and apparatus, a device and a medium, wherein the method comprises: acquiring a node connection line diagram for implementing a target function; according to connection lines between node ports in the node connection line diagram, generating a splicing code representing a call relationship between nodes; and according to the splicing code and script codes written by the nodes in advance, generating a target script file corresponding to the target function.

14 Claims, 6 Drawing Sheets acquire a connection diagram of nodes for implementing a target function ⌒ 101 based on connection lines among node ports in the connection diagram of nodes, generate a splicing code representing call relationships among the nodes ⌒ 102 generate a target script file corresponding to the target function based on the splicing code and a script code pre-written for each node ⌒ 103

(58) Field of Classification Search
USPC ................................................ 717/106–125
See application file for complete search history.

(56) References Cited

U.S. PATENT DOCUMENTS

| | | | | |
|---|---|---|---|---|
| 9,710,235 | B2 * | 7/2017 | Azrieli ...................... | G06F 8/34 |
| 10,055,204 | B2 * | 8/2018 | Wang ......................... | G06F 8/30 |
| 10,789,360 | B2 * | 9/2020 | Johns ....................... | G06F 21/54 |
| 11,398,911 | B1 * | 7/2022 | Gunning ............. | G07F 17/0014 |
| 11,461,081 | B2 * | 10/2022 | Zhang .................. | G06N 3/0442 |
| 11,586,437 | B1 * | 2/2023 | Tripp ........................ | G06F 9/54 |
| 12,099,576 | B1 * | 9/2024 | Sherr .................... | G06N 5/045 |
| 2003/0037119 | A1 | 2/2003 | Austin | |
| 2005/0039176 | A1 | 2/2005 | Fournie | |
| 2013/0059006 | A1 | 3/2013 | Schmuck et al. | |
| 2014/0282364 | A1 | 9/2014 | Woodward | |
| 2015/0202348 | A1 | 7/2015 | Dvir et al. | |
| 2020/0366671 | A1 * | 11/2020 | Larson .................. | H04L 9/3231 |

FOREIGN PATENT DOCUMENTS

| | | | |
|---|---|---|---|
| CN | 107315581 | A | 11/2017 |
| CN | 107357567 | A | 11/2017 |
| CN | 109508298 | A | 3/2019 |
| CN | 109542422 | A | 3/2019 |
| CN | 110555291 | A | 1/2020 |
| CN | 110674341 | A | 1/2020 |
| CN | 110704043 | A | 1/2020 |
| CN | 111427561 | A | 7/2020 |
| CN | 111596909 | A | 8/2020 |
| CN | 112861059 | A | 5/2021 |
| EP | 3587564 | A1 | 1/2020 |
| KR | 101628821 | B1 | 6/2016 |
| KR | 1020180025817 | A | 3/2018 |
| WO | 2020/258656 | A1 | 12/2020 |

OTHER PUBLICATIONS

Yue et al, "RTCM: A Natural Language Based, Automated, and Practical Test Case Generation Framework", ACM, pp. 1-12 (Year: 2015).*

Yang et al, "Automatic Generation of Visual-Textual Presentation Layout", ACM, pp. 1-23 (Year: 2016).*

Mery et al, "Automatic Code Generation from Event-B Models", ACM, pp. 1-11 (Year: 2011).*

Cassano et al, "Knowledge Transfer from High-Resource to Low-Resource Programming Languages for Code LLMs", ACM, pp. 1-33 (Year: 2024).*

International Search Report and Written Opinion for PCT/CN2022/091676, mailed on Aug. 8, 2022, 13 pages.

European Search Report issued in European application No. 21754401.4.

Caroline Bonnans et al., Remodelling the extracellular matrix in development and disease, Nature Reviews Molecular Cell Biology, 2014, vol. 15, pp. 786-801.

English translation of Written Opinion issued in PCT/CN2022/091863, dated Jul. 27, 2022, 4 pages provided.

International Search Report (with English translation) and Written Opinion issued in PCT/CN2022/091863, dated Jul. 27, 2022, 9 pages provided.

Office Action received for Chinese Patent Application No. 202110729951.2, mailed on Feb. 2, 2026, 22 pages (11 pages of English Translation and 11 pages of Original Document).

* cited by examiner

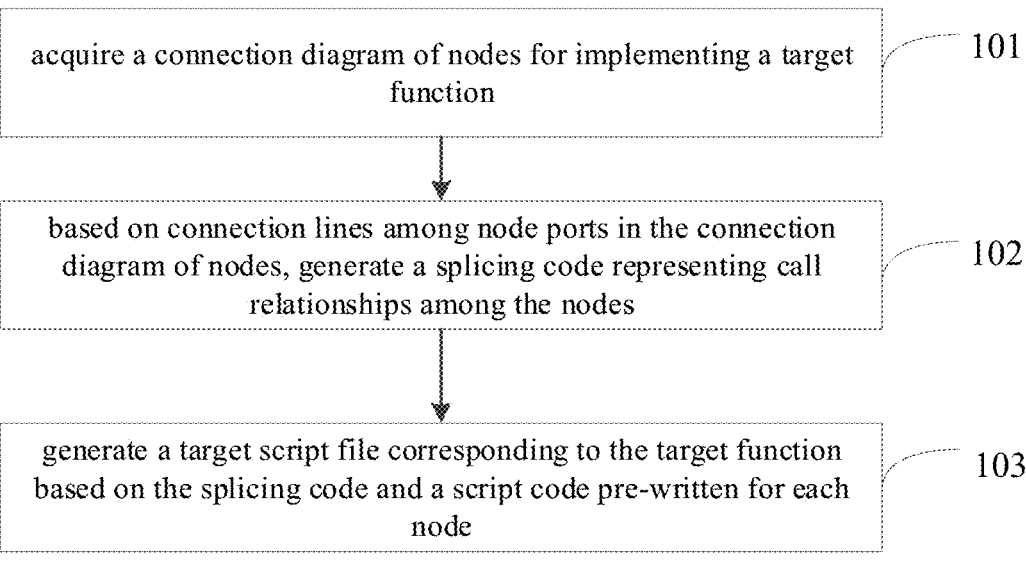

acquire a connection diagram of nodes for implementing a target function — 101 based on connection lines among node ports in the connection diagram of nodes, generate a splicing code representing call relationships among the nodes — 102 generate a target script file corresponding to the target function based on the splicing code and a script code pre-written for each node — 103

Fig. 1

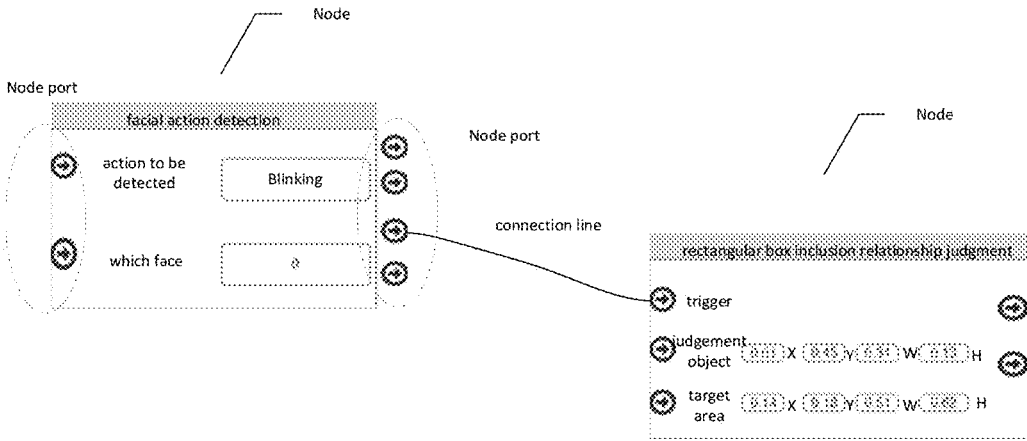

Fig. 2

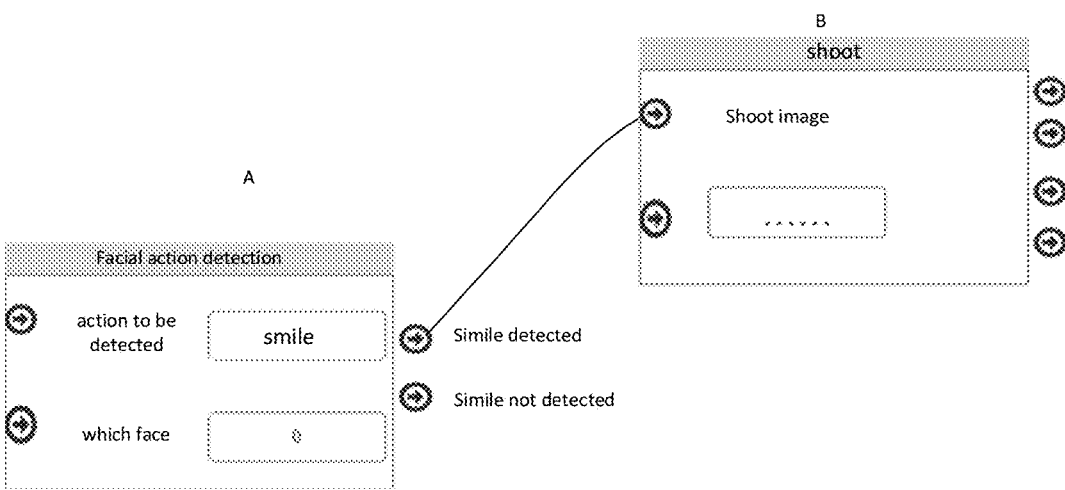

Fig. 3

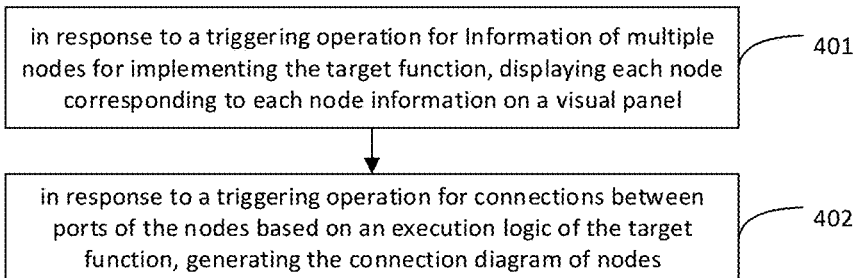

in response to a triggering operation for information of multiple nodes for implementing the target function, displaying each node corresponding to each node information on a visual panel — 401 in response to a triggering operation for connections between ports of the nodes based on an execution logic of the target function, generating the connection diagram of nodes — 402

Fig. 4

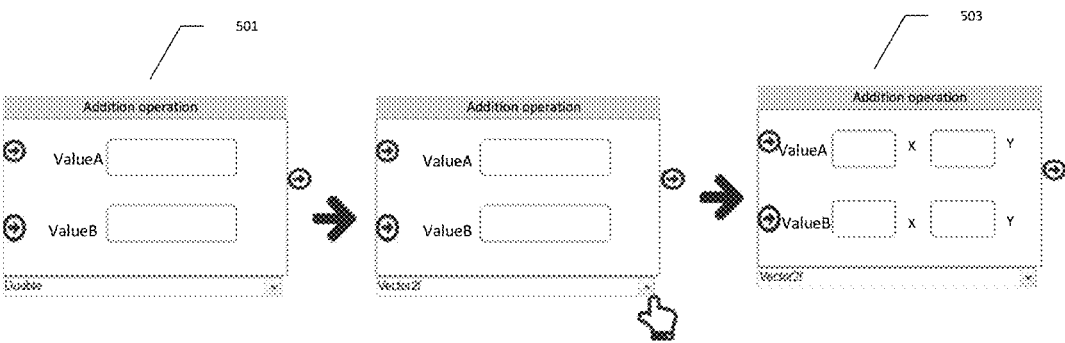

Fig. 5 perform topological sorting for the connection diagram of nodes, and sequentially traverse and detect the port type of each node in the connection diagram of nodes based on the sorting result — 901 generate the splicing code representing the call relationships among the nodes based on the port types and corresponding connection conditions — 902

SCRIPT GENERATION METHOD, ELECTRONIC DEVICE AND STORAGE MEDIUM

CROSS-REFERENCE OF RELATED APPLICATION

This application is a national stage of International Application No. PCT/CN2022/091863, filed on May 10, 2022, which claims the priority of a Chinese patent application No. 202110729951.2 filed in China Patent Office on Jun. 29, 2021, both of the aforementioned applications are hereby incorporated by reference in their entireties.

FIELD OF THE INVENTION

The invention relates to the technical field of computers, in particular to a script generation method, apparatus, device and medium.

BACKGROUND

With the development of computer technology, the realization of application functions relying on computer technology has become common, for example, special effects functions for short video applications.

In the related technology, the script of application functions is realized through the coding of professional technicians, for example, the special effects such as "changing clothes in the blink of an eye" are realized through scripts.

DISCLOSURE OF THE INVENTION

The present disclosure provides technical schemes related to script generation.

An embodiment of the present disclosure may provide a script generation method, which may include acquiring a connection diagram of nodes for implementing a target function; based on connection lines among node ports in the connection diagram of nodes, generating a splicing code representing call relationships among the nodes; and generating a target script file corresponding to the target function based on the splicing code and a script code pre-written for each node.

An embodiment of the present disclosure may also provide a script generation apparatus, which may include an acquisition module configured to acquire a connection diagram of nodes for implementing a target function: a first generation module configured to, based on connection lines among node ports in the connection diagram of nodes, generate a splicing code representing call relationships among the nodes; and a second generation module configured to generate a target script file corresponding to the target function based on the splicing code and a script code pre-written for each node.

An embodiment of the present disclosure may also provide an electronic device, which may include a processor: a memory for storing instructions executable by the processor: the processor is used for reading the executable instructions from the memory and executing the instructions to implement the script generation method provided by embodiments of the present disclosure.

An embodiment of the present disclosure may also provide a computer-readable storage medium storing a computer program, which is used for executing the script generation method provided by embodiments of the present disclosure.

An embodiment of the present disclosure may also provide a computer program, which includes program codes that, when executed by a computer, cause the computer to execute the script generation method provided by embodiments of the present disclosure.

DESCRIPTION OF THE DRAWINGS

The above and other features, advantages and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the elements are not necessarily drawn to scale.

FIG. 1 is a schematic flowchart of a script generation method provided by an embodiment of the present disclosure;

FIG. 2 is a schematic diagram of a connection diagram of nodes provided by an embodiment of the present disclosure;

FIG. 3 is a schematic diagram of another connection diagram of nodes provided by an embodiment of the present disclosure:

FIG. 4 is a schematic flowchart of another script generation method provided by an embodiment of the present disclosure:

FIG. 5 is a schematic diagram of a node determination scenario provided by an embodiment of the present disclosure:

DETAILED DESCRIPTION OF PREFERRED EMBODIMENTS

Figure 6:
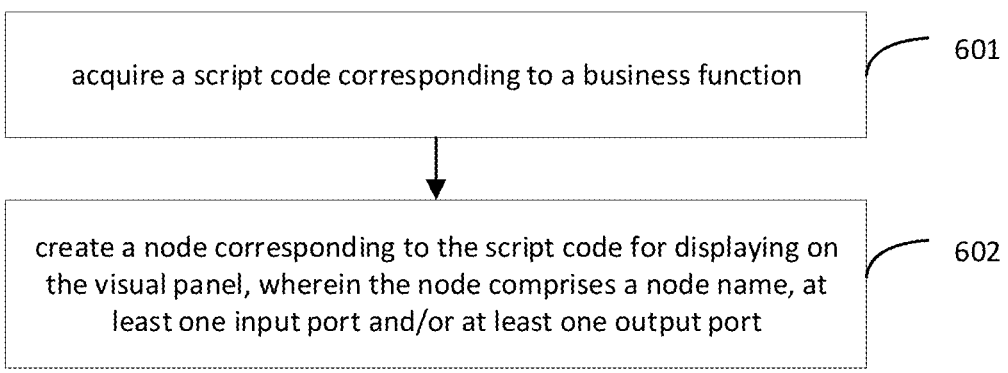
FIG. 6 is a schematic flowchart of another script generation method provided by an embodiment of the present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including" and its variants are open-ended including, that is, "including but not limited to". The term "based on" is "at least partially based on". The term "an embodiment" means "at least one embodiment": the term "another embodiment" means "at least one other embodiment": the term "some embodiments" means "at least some embodiments". Related definitions of other terms will be given in the following description.

It should be noted that the concepts of "first" and "second" mentioned in this disclosure are only used to distinguish different apparatuses, modules or units, and are not used to limit the order or interdependence of the functions performed by these apparatuses, modules or units.

It should be noted that the modifications of "a" and "a plurality" mentioned in the present disclosure are schematic rather than limiting, and those skilled in the art should understand that they should be understood as "one or more", unless clearly indicated in the context.

Names of messages or information exchanged among multiple apparatuses in embodiments of the present disclosure are only used for illustrative purposes, and are not used to limit the scope of these messages or information.

However, in the implementation of the application functions, users need to master code writing, and users manually write scripts of application functions, which has high learning cost and low script generation efficiency.

In order to solve the above-mentioned problem that the script generation for application functions requires users to master the code writting language, which leads to high learning cost, the present disclosure proposes a node-based visual way to generate scripts, in which a node encapsulates corresponding codes, and a user can realize script generation by connecting nodes on a visual interface without mastering code writing.

In the following, the script generation method will be introduced with specific examples.

FIG. 1 is a schematic flowchart of a script generation method provided by an embodiment of the present disclosure, which can be executed by a script generation apparatus, wherein the apparatus can be implemented by software and/or hardware, and generally can be integrated in an electronic device. As shown in FIG. 1, the method includes:

Step 101: acquire a connection diagram of nodes for implementing a target function.

Among them, the target function can be any application function that needs to be implemented by a script, for example, special effects to achieve the effect of "changing clothes in the blink of an eye" and so on.

In addition, as shown in FIG. 2, the above-mentioned connection diagram of nodes can include nodes, node ports, connection lines and other elements, wherein a node can be regarded as a piece of fixed code encapsulation for providing a target function or a sub-function of the target function: a port corresponds to a node, and the port can include an input port and an output port: connection lines are used to connect different ports on different nodes, the connection can be triggered by users, or can match the connection through logical identification of the target function. For example, when the business logic of the target function is "Identify whether the user turns on the camera—if the user turns on the camera, then shoot picture", according to the above business logic, a node corresponding to the sub-function of "Identify whether the user turns on the camera" and the ports of a node corresponding to the sub-function of "Shoot picture" are connected. In this embodiment, codes for corresponding nodes can be combined by connection lines between nodes, and a target script file can be generated according to the connection logic between nodes.

Step 102: based on connection lines among node ports in the connection diagram of nodes, generate a splicing code representing call relationships among the nodes.

As mentioned above, each node encapsulates corresponding execution codes, which can be regarded as a script code fragment and actually as an execution function, while the execution function needs to call a logic, and the calling here can be reflected by connection lines between nodes, in which ports corresponding to the connection lines reflect the call relationship between nodes, and the splicing code representing the call relationship between nodes is generated, which can be interpreted as a call code for the execution function.

Therefore, in the present embodiment, according to connection lines between the nodes in the connection diagram of nodes, the splicing code representing the call relationship between nodes can be generated, and the splicing code is essentially a call code for an execution function between nodes. For example, for two nodes, when they are nodes corresponding to two detection action codes, the splicing code can be a certain detection result port of the node corresponding to the first detection action, and a call code corresponding to a certain trigger port of the node corresponding to the second detection action.

Step 103: generate a target script file corresponding to the target function based on the splicing code and a script code pre-written for each node.

Because each node encapsulates the corresponding code, and the splicing code is the call function for the execution function between nodes, the target script file corresponding to the target function can be generated based on the splicing code and the script code pre-written for each node.

Therefore, users do not need to write codes, and only based on the connection operation between nodes, can obtain corresponding scripts. Because the ports of nodes and the codes encapsulated by nodes are preset, the executability of scripts can be guaranteed, and the efficiency of script generation can be improved.

Of course, in order to guarante the executability of the target script file, it is also necessary to ensure that the splicing code is of a code language consistent with that of the codes encapsulated in the nodes, that is, in an embodiment of the present disclosure, it also shall be detected whether the language for the splicing code matches that for the script code pre-written for each node, and if not, the splicing code can be converted into a code language matching the script code pre-written for each node, such conversion can be implemented by a conversion tool, or obtained by querying and matching the pre-set correspondence.

For example, when node A and node B are included in the connection diagram of nodes, node A encapsulates an execution code for "Smile detection", its corresponding node output ports include a "smile detected" port and a "smile not detected" port, and node B encapsulates an execution code for "Shoot picture", and its corresponding input port is a "shoot" port, as shown in FIG. 3, if the connection between nodes A and B is that the "smile detected" port of node A is connected to the "shoot" port of node B, the generated splicing code between nodes A and B is a call code for connection between the "smile detected" port and the "shoot" port, so that the target script file generated based on the splicing code between nodes A and B and the pre-written script codes is a combination of the code for "smile detection", the call code for "when simile is detected, trigger shooting an picture" and the code for "shoot picture".

To sum up, the script generation method provided by an embodiment of the present disclosure can acquire a connection diagram of nodes for implementing a target function, then based on connection lines among node ports in the connection diagram of nodes, generate a splicing code representing call relationships among the nodes, and then generate a target script file corresponding to the target function based on the splicing code and a script code pre-written for each node. Therefore, by encapsulation of abstract script codes implemented by the connection diagram of nodes, the generation of a functional target script file is implemented based on visual connection diagram of nodes, which improves efficiency and accuracy of generating the target script file and reduces the learning cost of generation of the target script file.

In an actual execution process, in order to facilitate a user to establish a corresponding connection operation, the above-mentioned connection diagram of nodes can be visually displayed to the user, so that the user can understand and create an execution logic for the current script, without needing to master the code.

In an embodiment of the present disclosure, as shown in FIG. 4, the method further comprises:

Step 401: in response to a triggering operation for information of multiple nodes for implementing the target function, displaying each node corresponding to each node information on a visual panel.

Among them, the node information can be any identification information that can point to at least one node in the form of words, letters, etc., when the node information is the identification information pointing to multiple nodes, it can be understood that one node information corresponds to multiple nodes that each implements the same sub-function, for example, if the node information is "monitoring sub-function", the corresponding nodes can be node A that implements the monitoring sub-function and node B that implements the monitoring sub-function.

In the present embodiment, a node information database can be established in advance, which contains a large amount of node information, and each node information can be triggered and selected, therefore, in response to the triggering operation for information of a plurality of nodes for implementing the target function, each node corresponding to each node information is displayed on the visual panel.

Among them, the visual panel can be regarded as a container of nodes, which is used to display nodes, node ports and node connections.

In the present embodiment, information of a plurality of nodes corresponding to the target function can be triggered by the user manually. In the present embodiment, when the node information is a node name, the user can search for a plurality of pre-created names of nodes for implementing the target function, wherein the user can input a trigger in a preset search bar, or call the search bar in other trigger manners, such as calling the search bar by right clicking, inputting the corresponding node names in the search bar, and in turn, in respondence to the triggering operation for each node name, each node corresponding to each node information can be displayed on the visual panel.

In the present embodiment, it is also possible to search for extensible data types of a node currently displayed on the visual panel, that is, certain nodes are displayed on the current visual panel, and the corresponding data type of each node can be changed, and the changeable data type is the extensible data type. In this embodiment, the extensible data types can be displayed in the form of list (for example, by triggering data type A in the list, the user can modify the data type of the corresponding nodes to data types A), which will not be listed one by one here, therefore, in response to a triggering operation for a target data type in the extensible data types, the data type of the current display node is switched to a node matching the target data type. That is to say, in this embodiment, an original displayed current node which is currently displayed can be directly switched to display a node matching the target data type, by changing the data type of the current displayed node, so as to realize the acquisition of the node for the target function.

For example, as shown in FIG. 5, if the currently displayed node encapsulates "addition" code and the corresponding data type is "Double", then the execution function of the currently displayed node 501 is one-dimensional addition of two numbers. If in response to the trigger operation for the target data type in the extensible data types, for example, the selected target data type is "Vector2f", then the extensible data type of the currently displayed node includes "Vector2f", as shown in FIG. 5, in response to the trigger operation for "Vector2f", the currently displayed node is switched to a node corresponding to an execution function of the two-dimensional addition of two numbers, as shown in node 503 in FIG. 5.

In the present embodiment, the multiple node information of the target function can also be learned according to a pre-learned deep learning model after the target function is determined, that is, the target function is input into the pre-established deep learning model, and multiple node information output from the deep learning model can be acquired, so that the acquired multiple node information can be displayed to the user, if the user's confirmation operation is acquired, it is considered that the trigger operation for the multiple node information for implementing the target function is acquired.

Step 402: in response to a triggering operation for connections between ports of the nodes based on an execution logic of the target function, generating the connection diagram of nodes.

In the embodiment, a user's triggering operation for connection between ports of each node can be received on the visual panel to generate a connection diagram of nodes, wherein the connection triggering operation can be triggered by a user's finger or by a trigger device, including but not limited to a mouse, a stylus, and the like.

In this embodiment, the connection diagram of nodes can also be generated by automatically connecting ports of the nodes according to the execution logic of the target function, wherein the execution logic defines the execution order of the execution functions for specific connections among the nodes, so that according to the execution logic, a corresponding connection diagram of nodes can be determined.

For example, when the execution logic of the target function is "first detect the face smile, and then shoot an image for the face smile", the corresponding connection is that the node "detect face smile" is connected to the node "shoot picture", wherein the execution data for "detect face smile" is that the "smile detected" port is connected to the "shoot picture" port of the "shoot" node.

It should be emphasized that the connection diagram of nodes on the front-end visual interface only shows each node and the connection lines between them. If the user wants to avoid manually writing codes, in an embodiment of the present disclosure, the connection diagram of nodes may also correspond to the script code.

In this embodiment, as shown in FIG. 6, in addition to generating the connection diagram of nodes at the front end, it is also necessary to correspond a node with a script code, that is, the method further includes:

Step 601: acquire a script code corresponding to a business function.

In this embodiment, as mentioned above, a node encapsulates a corresponding execution code, that is, a script fragment, in the underlying implementation. Therefore, in this embodiment, some commonly used script fragments can be represented by a node, each script fragment usually corresponds to an atomic function in the function, so as to improve the flexibility of application. The atomic function can usually be interpreted as a minimum functional unit of a common sub-function, and the script fragment corresponding to the minimum functional unit can be encapsulated in advance, without needing to write codes every time it is used, moreover, because the atomic function can belong to some commonly used sub-functions, the efficiency of function execution can be improved more significantly. For example, the script code can include a code fragment related to AND-OR judgment, so because AND-OR judgment is a commonly used sub-function in many business functions, the code fragment corresponding to AND-OR judgment is usually used as a whole. Therefore, the AND-OR function can serve as an atomic function, and the code fragment related to AND-OR judgment can be encapsulated as a node. Of course, if a plurality of script fragments not corresponding to the minimum functional unit are usually used together, the plurality of script fragments can also be encapsulated as a node. For example, in an image processing scene, two minimum functional units "face detection" and "smile detection" are usually used together, so the script fragments corresponding to such the two minimum functional units "face detection" and "smile detection" can be encapsulated as a node.

In this embodiment, the script code corresponding to the business function can be acquired, and the business function usually includes a plurality of function sets with partially identical atomic functions, which include the target function of the application. For example, for a face recognition business, the corresponding functions can comprise "face recognition shoot", "face recognition beauty makeup" and "face recognition special effect addition", and the target function can be any one of them, that is, a plurality of atomic functions corresponding to the business function can be acquired and script code fragments corresponding to the atomic functions can be acquired.

Step 602: create a node corresponding to the script code for displaying on the visual panel, wherein the node comprises a node name, at least one input port and/or at least one output port.

It can be understood that in this embodiment, in order to further improve the simplicity of operation, a node displayed on the visual panel may include node name, at least one input port and/or at least one output port. The input of the input port is used to receive input parameters for the node. For example, if the input interface is a data type input port, the numerical value received by the input port is the input parameters for the node, and the output port represents a return value of the execution result after the script code corresponding to the node is executed on the input parameters. Then, the input and output of different nodes can be connected in series by connection lines, which represents the call relationship of functiocompleted.ns, and the call relationship corresponds to the splicing code in this embodiment, therefore the generation of a whole set of script logic can be completed.

In an embodiment of the present disclosure, at least one input port includes: a data type input port and/or a control type input port, and similarly, at least one output port includes a data type output port and/or a control type output port, wherein the data type ports are differentiated in terms of data types, including integer, floating point, character, etc., and the corresponding ports and data types are consistent, for example, When two nodes with connection relationship under a connection limitation include a first node and a second node, the data type output port on the first node is of a data type consistent with the data type of the data type input port on the second node to be connected.

In an actual implementation, the data input port can have two sources: user input or the output from the previous node. Among them, if there is a connection line on the input port, the port will no longer accept user input. The reason is that if the user input can still be accepted, there will be ambiguity, that is, it is uncertain whether the user input or the output from the previous node will prevail at this time. The output port represents the output information of the node. That is, in an embodiment of the present disclosure, in order to avoid ambiguity, the data type input port can only be connected to one data type output port, and one data type output port on the first node can be connected to one or more data type input ports on the second node, and one data type input port on the second node can be connected to one data type output port on the first node.

Meanwhile, it can be understood that the logic execution of a node needs to be triggered in some way, that is, a node needs to be informed to start executing its encapsulated code logic. This triggering mode can be realized through a control port in this embodiment. The control port is not related to data type, and the control port can be an input port or an output port. The input control port means that when the port is triggered, the logic of the node will be executed: similarly, the output control port means that this port will trigger an input control port of the next node to be connected subsequently.

In an embodiment, the control type input port can be connected to one or more control type output ports. In some possible implementations, OR logic can be utilized among different output control ports to screen the input parameters for the input control port which are connected. For example, when the input control port is "ON", if it corresponds to two input parameters, when any one of the input parameters occurs, the execution of "ON" can be controlled, wherein a control type output port is connected with one control type output port of the next node.

In other possible embodiments, AND logic can be utilized among different output control ports to determine the input parameters for the input control port. For example, when the input control port is "ON", if it corresponds to two input parameters, the execution of "ON" can be controlled only when both of two input parameters occur. It should be emphasized that the script languages for the script code fragments encapsulated in a node can be various, since the script is edited in a node-based visual way, a user does not need to know what script language is used, but only need to pay attention to the node function: in addition, even if a carrier application of the target function keeps iterative, there will be the same case that the interface function or parameters changes, in this case, if the codes are handwritten, it is necessary to modify the handwritten codes along with change of the function or parameters, and the maintenance cost is high. By using node-based visual programming, this change can be maintained in the node, and the user is also unaware: moreover, due to the uneven coding ability and experience of users, the quality of the written codes can not be guaranteed, by using nodes to make unified coding encapsulation, it can pass strict testing and the execution efficiency and quality of the codes can be improved.

Figure 7:
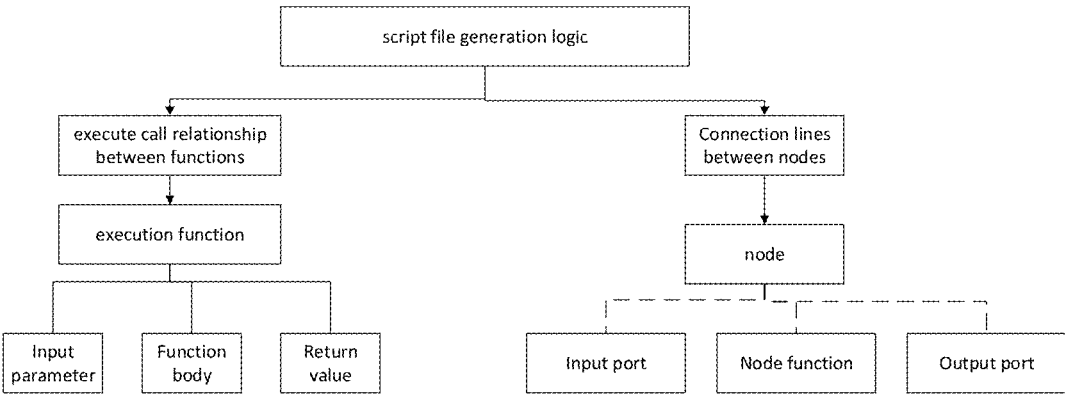
FIG. 7 is a schematic logic diagram of script generation provided by an embodiment of the present disclosure.

As shown in FIG. 7 (the dotted line part indicates an architecture of the connection diagram of nodes corresponding to the script file, that is, the dotted line part indicates a generation logic of the script file in the node dimension, and the solid line part indicates the structure of the execution function corresponding to the script file, that is, the solid line part indicates the generation logic of the script file in the execution function dimension, and the connection diagram of nodes is essentially a front-end visual display of the call relationship of the execution function), the script generation logic for the target function can actually be regarded as calling of some functions, wherein a function is composed of input parameters, function bodies and return values. In this embodiment, according to an application scenario, some commonly used script code fragments can be represented by one node, the input port is used to represent its input parameters, and the output port represents the return values. Then, the input and output of the node are connected in series with a connection line, and the splicing code corresponding to the connection line represents the call relationship of the function, therefore, the generation of a whole set of script logic can be completed.

Figure 8:
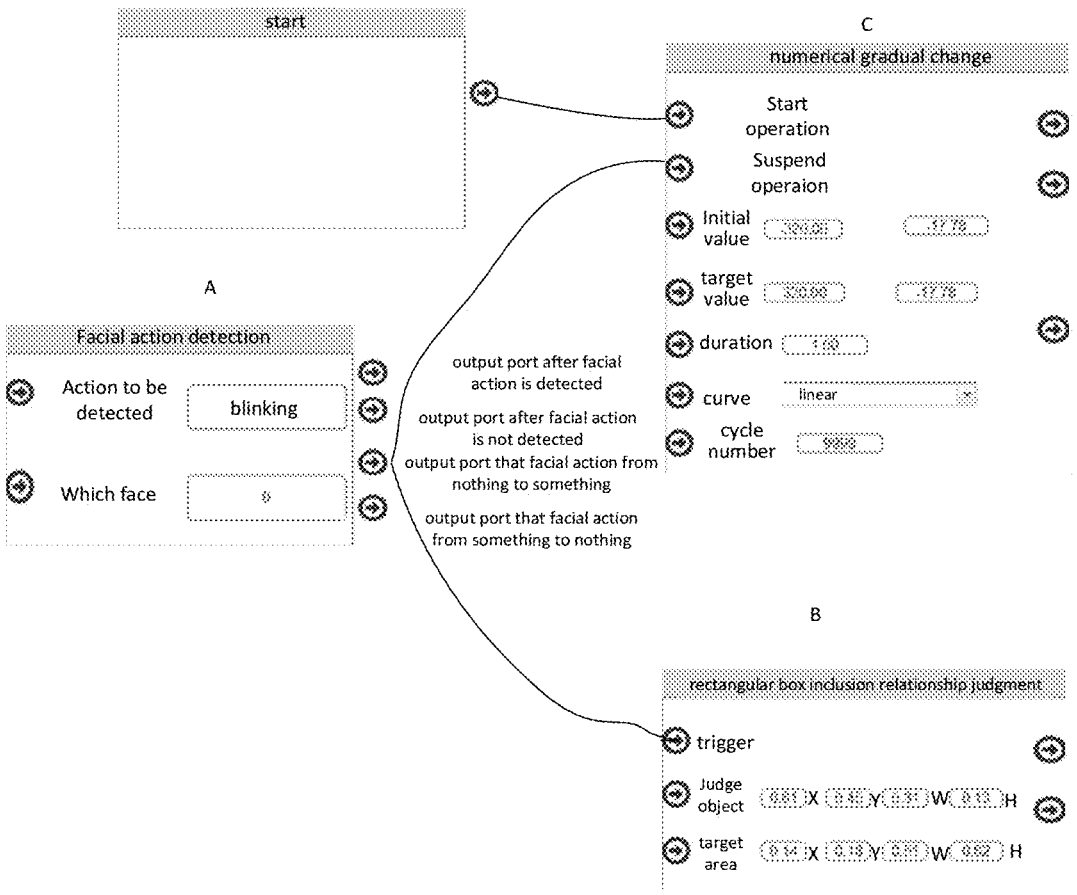
FIG. 8 is a schematic diagram of another connection diagram of nodes provided by an embodiment of the present disclosure.

Taking a specific scene as an example, as shown in FIG. 8, when the connection diagram of nodes includes node A, node B and node C, the code encapsulated in node A is the detection code corresponding to "facial action detection", and the detected action is "blinking", and the node has four output ports, which are "output port after facial action is detected", "output port after facial action is not detected", "output port that facial action from nothing to something" and "output port that facial action from something to nothing" respectively. Node B encapsulates the codes for "rectangular box inclusion relationship judgment", and the input ports included in this node can include "trigger input port", "judgment object input port" and "target area input port", and node C encapsulates codes related to "numerical gradual change" processing, and the output ports may include "start running input port", "suspend running input port", etc., if the "output port after facial action is not detected" of node A is connected with "suspend running input port" of node C, it means that if the input result is "no blinking action is detected" after executing the code corresponding to node A, the "numerical gradual change" processing will be suspended. if the "output port after facial action is not detected" of node A is connected with "trigger input port" of node B, it means that if the input result is "no blinking action is detected" after the codes corresponding to node A are executed, the codes for "rectangular box inclusion relationship judgment" corresponding to node B can be triggered to be executed, and "no blinking action is detected", the function of node B is executed, to, in accordance with the input parameters for "judgment object input port" and "target area input port", start executing the sub-functions corresponding to the ports, otherwise, even if the input parameters for "judgment object input port" and "target area input port" exist, the sub-functions corresponding to the ports will be executed.

To sum up, the script generation method according to embodiments of the present disclosure generates the connection diagram of nodes in a visual way, while users do not need to master the coding rules, and the nodes encapsulate corresponding script fragments, and a corresponding target script can be generated based on the connection between nodes by splicing the corresponding script fragments, thus improving the script generation efficiency, reducing the learning cost of users and expanding the development flexibility of the target function.

Based on the above embodiments, it is not difficult to understand that the calling for connection between nodes is represented by a connection line, and the connection line, when mapped to the code level, may mean the splicing code representing the call relationship between nodes. With reference to specific example, the following will describe in detail how to generate the splicing code representing the call relationship between nodes according to the port types and the corresponding connection conditions.

Figure 9:
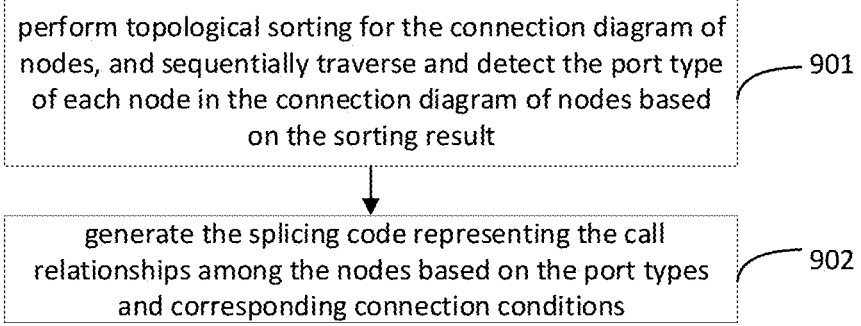
FIG. 9 is a schematic flowchart of another script generation method provided by an embodiment of the present disclosure.

In the present embodiment, as shown in FIG. 9, the generation of the splicing code includes:

Step 901: perform topological sorting for the connection diagram of nodes, and sequentially traversing and detecting the port type of each node in the connection diagram of nodes based on the sorting result.

Among them, because the connection lines between nodes in the connection diagram of nodes constitute a directed acyclic graph among nodes, the connection diagram of nodes can be sorted based on the topological sorting in a manner from a partial order to a total order, so that the port type of each node in the connection diagram of nodes can be traversed according to the sorting result sequentially, wherein the port type can be determined according to the name of port or the pattern type or color of port, etc., which are not limited here.

Step 902: generate the splicing code representing the call relationships among the nodes based on the port types and corresponding connection conditions.

In this embodiment, the splicing code representing the call relationships among the nodes is generated based on the port types and corresponding connection conditions, that is, in this embodiment, the splicing code can be generated according to specific ports called between nodes and the call relationship of the specific ports.

In an embodiment of the present disclosure, if it is detected that the current node being processed contains a data type input port, then it is detected whether there is a connection line to the data type input port or not.

If there is a connection line to the data type input port, the corresponding splicing code is generated according to an output port of an upstream node connected to the data type input port of the current node, that is, if the output port of the upstream node is connected to the data type input port of the current node, it indicates that the data type input port of the current node depends on the output from the output port of the upstream node, thereby a corresponding splicing code can be generated according to the output port of the upstream node.

For example, suppose that a data type output port (serial number 0) of node A is connected to the input port of node B (serial number 0), then the generated corresponding splicing codes are:

local node_a=new NodeA( )// indicates that the first node connected by splicing code is A.

local node_b=new NodeB( )// indicates that the second node connected by splicing code is B.

node_b:setInput(0, node_a:getOutput(0))// indicates association of corresponding sub-functions of the output port 0 of node A with the input port 0 of node B.

Therefore, the calling for Node A and Node B can be associated through the splicing code, wherein the encapsuled code corresponding to Node A and the encapsuled code corresponding to Node B are called and executed through the splicing code, to generate the corresponding target script file between Node A and Node B.

In the embodiment, if there is no connection line to the data type input port, the corresponding splicing code can be generated according to an input value of the user at the data type input port of the current node.

For example, assuming that Node B still has a data type input port (serial number 1) where there is no connection, a corresponding splicing code can be generated according to the input value as follows:

> Local user_input=the data object corresponding to the user input value:
> node_b:setInput(1, user_input);

Then, the output port of the node can be processed. If it is known that the current node includes a control type output port, then it is detected whether there is a connection line to the control type output port or not. At this time, only the control type port needs to be processed. That is, if there is no connection line, it will skip directly, and if there is the connection line, the corresponding splicing code will be generated according to the input port of a downstream node connected to the control type output port of the current node.

For example, assuming that node A has a control type output port (serial number 1) which is connected to the control input port of node B (serial number 1), the corresponding generation pseudo codes are:

> local node_a=new NodeA( )// indicates that the first node connected by splicing code is A.
> local node_b=new NodeB( )// indicates that the second node connected by splicing code is B.
> node_a:setTriggerNext(1, node_b:execute(1))// indicates association of corresponding sub-functions of the output port 1 of node A with the input port 1 of node B, where in the code corresponding to the sub-function association: node_a:setTriggerNext t (1, . . . ) indicates the execution when the output port 1 of node A is triggered, and node_b:execute(1) indicates the function corresponding to the input port 1 of node B as the executed object.

Thus, the above operations are performed on each node, and finally these codes are integrated into a target script file, thus completing visual editing for the script logic.

In order to make those skilled in the art more clearly understand the script generation mode according to embodiments of the present disclosure, the following presents an example with specific application scenarios:

Among them, in the embodiment, the nodes in the connection diagram of nodes are manually triggered for connection by the user, and the obtained connection diagram of nodes is first sorted topologically once, and after sorting, each node is taken sequentially in order to obtain the script code corresponding to the node. Then, according to the connection of nodes, the called splicing code is generated in the script, for the input ports of nodes, only the port of data type needs to be processed, because the input of data port will depend on the output of the previous one. Then first, it is detected whether there is a connection, if not, the value input by the user can be acquired, and if there is a connection, the value corresponding to the output port of the opposite end of the connection will be acquired, and the target script file is generated according to the corresponding value.

Figure 10:
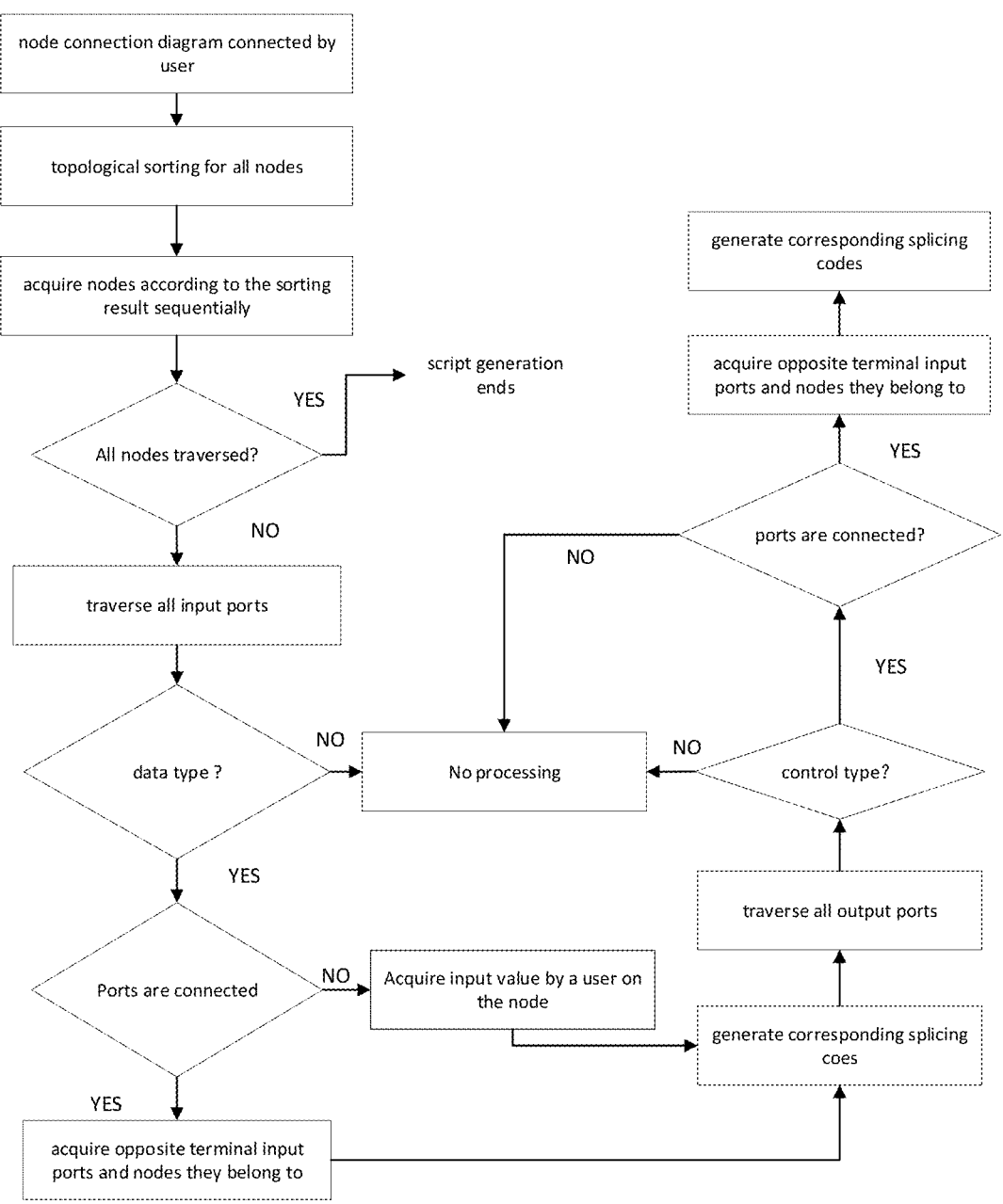
FIG. 10 is a schematic flowchart of another script generation method provided by an embodiment of the present disclosure.

As shown in FIG. 10, the connection diagram of nodes by user connection is obtained, and all nodes in the connection diagram of nodes are sorted, such as topological sorting, etc., and then the nodes in the connection diagram of nodes are traversed according to the sorting result sequentially, all input ports are traversed first, if it is detected that the current node being processed includes a data type input port, it is detected whether there are connection lines to the data type input port or not, if there are connection lines to the data type input port, then a corresponding splicing code is generated according to an output port of an upstream node connected to the data type input port of the current node, and if there are no connection line to the data type input port, the corresponding splicing code is generated according to the input value by the user at the data type input port of the current node.

Furthermore, if it is known that the current node includes a control type output port, it is detected whether there are connection lines to the control type output port or not, and if there are connection lines to the control type output port, then a corresponding splicing code is generated according to an input port of a downstream node connected to the data type input port of the current node.

To sum up, in the script generation method of an embodiment of the present disclosure, the splicing code between nodes can be generated according to the port types of the nodes, and the target script file is finally generated by concatenating the splicing codes with the execution logic of the nodes, so that the user does not need to master the code writing rules, and the script generation efficiency is further improved.

In order to implement the above embodiments, the present disclosure also provides a script generation apparatus.

Figure 11:
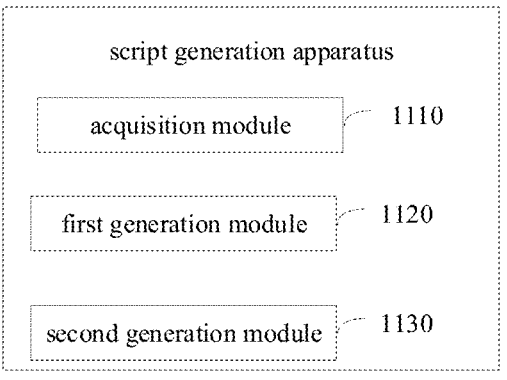
FIG. 11 is a schematic structural diagram of a script generation apparatus provided by an embodiment of the present disclosure.

FIG. 11 is a schematic structural diagram of a script generation apparatus provided by an embodiment of the present disclosure, the apparatus can be realized by software and/or hardware and can be generally integrated in an electronic device. As shown in FIG. 11, the device includes an acquisition module 1110, a first generation module 1120 and a second generation module 1130, wherein, The acquisition module 1110 is configured to acquire a connection diagram of nodes for implementing a target function:

> the first generation module 1120 is configured to, based on connection lines among node ports in the connection diagram of nodes, generate a splicing code representing call relationships among the nodes; and
> the second generation module 1130 is configured to generate a target script file corresponding to the target function based on the splicing code and a script code pre-written for each node.

The script generation apparatus provided by the embodiment of the present disclosure can execute the script generation method provided by any embodiment of the present disclosure, and has functional modules and can achieve beneficial effects corresponding to the method, which will not be repeated here, for the sake of brevity.

It should be noted that the above modules are only divided according to their specific functions, and are not used to limit their specific implementation, for example, they can be implemented in software, hardware or a combination of software and hardware. In actual implementation, the above modules can be realized as independent physical entities, or can also be realized by a single entity (for example, a processor (CPU or DSP, etc.), an integrated circuit, etc.).

In addition, although not shown, the device may also include a memory, which may store various information generated by the apparatus and various modules included in the apparatus during operation, programs and data used for operation, data to be transmitted by the communication unit, and the like. The memory may be a volatile memory and/or a nonvolatile memory. For example, the memory may include, but is not limited to, random access memory (RAM), dynamic random access memory (DRAM), static random access memory (SRAM), read-only memory (ROM), and flash memory. Of course, the memory may also be located outside the apparatus. Alternatively, although not shown, the apparatus may also include a communication unit, which may be used to communicate with other devices. In an example, the communication unit can be implemented in an appropriate manner known in the art, and will not be described in detail here. In order to realize the above embodiments, the present disclosure also provides a computer program product, including computer programs/instructions, wherein the computer programs/instructions, when executed by a processor, implement the steps of the script generation method as mentioned in the above embodiments.

Figure 12:
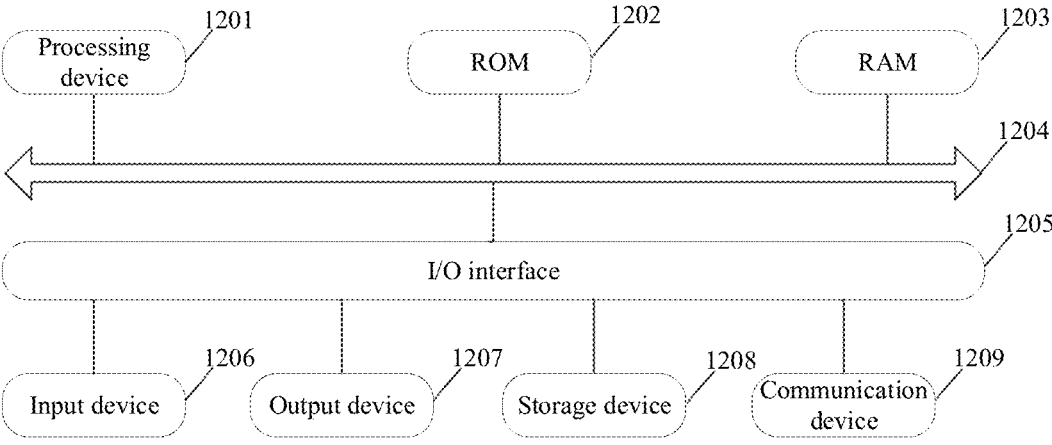
FIG. 12 is a schematic structural diagram of an electronic device provided by an embodiment of the present disclosure.

FIG. 12 is a schematic structural diagram of an electronic device provided by an embodiment of the present disclosure.

Referring specifically to FIG. 12, there is shown a structural schematic diagram of an electronic device 1200 suitable for implementing an embodiment of the present disclosure. The electronic device 1200 in the embodiment of the present disclosure may include, but is not limited to, mobile terminals such as mobile phones, notebook computers, digital broadcast receivers, PDA (Personal Digital Assistant), PAD (Tablet Computer), PMP (Portable Multimedia Player), vehicle-mounted terminals (such as vehicle-mounted navigation terminals), wearable electronic devices, etc., and fixed terminals such as digital TV, desktop computers, and smart home devices. The electronic device shown in FIG. 12 is just an example, and should not bring any limitation to functions and application scopes of embodiments of the present disclosure.

As shown in FIG. 12, an electronic device 1200 may include a processing device (such as a central processing unit, a graphics processor, etc.) 1201, which may perform various appropriate actions and processes according to a program stored in a read-only memory (ROM) 1202 or a program loaded from a storage device 1208 into a random access memory (RAM) 1203. In the RAM 1203, various programs and data required for the operation of the electronic device 1200 are also stored. A processing device 1201, a ROM 1202 and a RAM 1203 are connected to each other through a bus 1204. An input/output (I/O) interface 1205 is also connected to the bus 1204.

Generally, the following devices can be connected to the I/O interface 1205: an input device 1206 including, for example, a touch screen, a touch pad, a keyboard, a mouse, a camera, a microphone, an accelerometer, a gyroscope, etc.: an output device 1207 including, for example, a liquid crystal display (LCD), a speaker, a vibrator, etc., a storage device 1208 such as a magnetic tape, a hard disk, etc., and a communication device 1209. The communication device 1209 may allow the electronic device 1200 to communicate wirelessly or wired with other devices to exchange data. Although FIG. 12 shows an electronic device 1200 with various devices, it should be understood that it is not required to implement or have all the devices shown. More or fewer devices may alternatively be implemented or provided.

In particular, according to an embodiment of the present disclosure, the process described above with reference to the flowchart can be implemented as a computer software program. For example, an embodiment of the present disclosure includes a computer program product including a computer program carried on a non-transitory computer-readable medium, which contains program codes for executing the method shown in the flowchart. In such an embodiment, the computer program can be downloaded from the network through the communication device 1209 and installed, or installed from the storage device 1208, or installed from the ROM 1202. When the computer program is executed by the processing device 1201, the above functions defined in the script generation method according to embodiments of the present disclosure are executed.

It should be noted that the computer-readable medium mentioned above in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, apparatus or device, or a combination of any of the above. More specific examples of computer-readable storage media may include, but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this disclosure, a computer-readable storage medium can be any tangible medium containing or storing a program, which can be used by or in combination with an instruction execution system, apparatus or device. In this disclosure, a computer-readable signal medium may include a data signal propagated in baseband or as part of a carrier wave, in which computer-readable program codes are carried. The propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, RF (radio frequency) and the like, or any suitable combination of the above.

In some embodiments, the client and the server can communicate by using any currently known or future developed network protocol such as HTTP(HyperText Transfer Protocol), and can be interconnected to digital data communication in any form or medium (for example, communication network). Examples of communication networks include a local area network ("LAN"), a wide area network ("WAN"), the Internet (for example, the Internet) and end-to-end network (for example, ad hoc end-to-end network), as well as any currently known or future developed network.

The computer-readable medium may be included in the electronic device: or it can exist alone without being assembled into the electronic device.

The computer-readable medium carries one or more programs, and when the one or more programs are executed by the electronic device, the electronic device can acquire a connection diagram of nodes for implementing a target function, then based on connection lines among node ports in the connection diagram of nodes, generate a splicing code representing call relationships among the nodes, and then generate a target script file corresponding to the target function based on the splicing code and a script code pre-written for each node. Therefore, by encapsulation of abstract script codes implemented by the connection diagram of nodes, the generation of a functional target script file is implemented based on visual connection diagram of nodes, which improves efficiency and accuracy of generating the target script file and reduces the learning cost of generation of the target script file.

Computer program codes for performing the operations of the present disclosure may be written in one or more programming languages or their combinations, including but not limited to object-oriented programming languages, such as Java, Smalltalk, C++, and conventional procedural programming languages, such as "C" language or similar programming languages. The program codes can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiment described in the present disclosure can be realized by software or hardware. Among them, the name of the unit does not constitute the limitation of the unit itself in some cases.

The functions described above herein may be at least partially performed by one or more hardware logic components. For example, without limitation, exemplary types of hardware logic components that can be used may include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of this disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but not limited to, an electronic, magnetic, optical, electromagnetic, infrared, or semiconductor system, device or equipment, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, the present disclosure provides a script generation method, which may include:

acquiring a connection diagram of nodes for implementing a target function:

based on connection lines among node ports in the connection diagram of nodes, generating a splicing code representing call relationships among the nodes:

generating a target script file corresponding to the target function based on the splicing code and a script code pre-written for each node.

According to one or more embodiments of the present disclosure, the script generation method provided in the present disclosure can further include:

in response to a triggering operation for information of a plurality of nodes for implementing the target function, displaying each node corresponding to each node information on a visual panel;

in response to a triggering operation for connections between ports of the nodes based on an execution logic of the target function, generating the connection diagram of nodes.

According to one or more embodiments of the present disclosure, in the script generation method provided in the present disclosure, wherein the in response to a triggering operation for information of a plurality of nodes for implementing the target function, displaying each node corresponding to each node information on a visual panel, can include:

searching a plurality of pre-created names of nodes for implementing the target function, and in respondence to a triggering operation for each node name, displaying each node corresponding to each node name on a visual panel, and/or, searching the extensible data types of the current display node on the visual panel, and in respondence to a triggering operation for a target data type in the extensible data types, switching the current display node to a node matching the target data type.

According to one or more embodiments of the present disclosure, the script generation method provided in the present disclosure can further include:

acquiring a script code corresponding to a business function;

creating a node corresponding to the script code for displaying on the visual panel, wherein the node comprises a node name, at least one input port and/or at least one output port.

According to one or more embodiments of the present disclosure, in the script generation method provided in the present disclosure, wherein, the at least one input port can include a data type input port and/or a control type input port;

the at least one output port can include a data type output port and/or a control type output port.

According to one or more embodiments of the present disclosure, in the script generation method provided in the present disclosure, wherein two nodes with a connection relationship therebtween may include a first node and a second node, wherein, a data type output port on the first node is of a data type consistent with that of a data type input port to be connected on the second node;

one data type output port on the first node is connected to one or more data type input ports on the second node, and one data type input port on the second node is connected to one data type output port on the first node;

one control type output port on the first node is connected to one control type input port on the second node, and one control type input port on the second node is connected to one or more control type output ports on the first node.

According to one or more embodiments of the present disclosure, in the script generation method provided in the present disclosure, wherein the based on connection lines among node ports in the connection diagram of nodes, generating a splicing code representing call relationships among the nodes, can include:

performing topological sorting for the connection diagram of nodes, and sequentially traversing and detecting the port type of each node in the connection diagram of nodes based on the sorting result;

generating the splicing code representing the call relationships among the nodes based on the port types and corresponding connection conditions.

According to one or more embodiments of the present disclosure, in the script generation method provided in the present disclosure, wherein the generating the splicing code representing the call relationships among the nodes based on the port types and corresponding connection conditions, comprises:

if it is detected that a current node contains a data type input port, detecting whether there exists a connection line to the data type input port or not;

if there exists a connection line to the data type input port, generating a corresponding splicing code according to an output port of an upstream node connected to the data type input port of the current node;

if there does not exist a connection line to the data type input port, generating a corresponding splicing code according to an input value by the user at the data type input port of the current node.

According to one or more embodiments of the present disclosure, the script generation method provided in the present disclosure may further include:

if it is known that the current node contains a control type output port, detecting whether there exists a connection line to the data type output port or not;

if there exists a connection line to the data type output port, generating a corresponding splicing code according to an input port of a downstream node connected to the data type output port of the current node.

According to one or more embodiments of the present disclosure, the script generation method provided in the present disclosure may further include, before the generating a target script file corresponding to the target function based on the splicing code and a script code pre-written for each node;

detecting whether the language for the splicing code matches that for the script code pre-written for each node, and if not, converting the splicing code into a code language matching the script code pre-written for each node.

According to one or more embodiments of the present disclosure, the present disclosure can provide a script generation apparatus, comprising:

an acquisition module configured to acquire a connection diagram of nodes for implementing a target function;

a first generation module configured to, based on connection lines among node ports in the connection diagram of nodes, generate a splicing code representing call relationships among the nodes;

a second generation module configured to generate a target script file corresponding to the target function based on the splicing code and a script code pre-written for each node.

According to one or more embodiments of the present disclosure, the script generation apparatus provided in the present disclosure can further include:

a display module configured to, in response to a triggering operation for information of a plurality of nodes for implementing the target function, display each node corresponding to each node information on a visual panel;

a third generation module configured to, in response to a triggering operation for connections between ports of the nodes based on an execution logic of the target function, generate the connection diagram of nodes.

According to one or more embodiments of the present disclosure, in the script generation apparatus provided in the present disclosure, wherein the display module is specifically configured to:

search a plurality of pre-created names of nodes for implementing the target function, and in respondence to a triggering operation for each node name, display each node corresponding to each node name on a visual panel, and/or, search the extensible data types of the current display node on the visual panel, and in respondence to a triggering operation for a target data type in the extensible data types, switch the current display node to a node matching the target data type.

According to one or more embodiments of the present disclosure, the script generation apparatus provided in the present disclosure can further include:

a code acquisition module configured to acquire a script code corresponding to a business function;

a creation module configured to create a node corresponding to the script code for displaying on the visual panel, wherein the node comprises a node name, at least one input port and/or at least one output port.

According to one or more embodiments of the present disclosure, in the script generation apparatus provided in the present disclosure, wherein, the at least one input port can include a data type input port and/or a control type input port:

the at least one output port can include a data type output port and/or a control type output port.

According to one or more embodiments of the present disclosure, in the script generation apparatus provided in the present disclosure, wherein two nodes with a connection relationship therebtween may include a first node and a second node, wherein, a data type output port on the first node is of a data type consistent with that of a data type input port to be connected on the second node;

one data type output port on the first node is connected to one or more data type input ports on the second node, and one data type input port on the second node is connected to one data type output port on the first node;

one control type output port on the first node is connected to one control type input port on the second node, and one control type input port on the second node is connected to one or more control type output ports on the first node.

According to one or more embodiments of the present disclosure, in the script generation apparatus provided in the present disclosure, wherein the first generation module is specifically configured to:

if it is detected that a current node contains a data type input port, detect whether there exists a connection line to the data type input port or not;

if there exists a connection line to the data type input port, generate a corresponding splicing code according to an output port of an upstream node connected to the data type input port of the current node;

if there does not exist a connection line to the data type input port, generate a corresponding splicing code according to an input value by the user at the data type input port of the current node.

According to one or more embodiments of the present disclosure, the script generation apparatus provided in the present disclosure may further include:

a first detection module configured to, if it is known that the current node contains a control type output port, detect whether there exists a connection line to the data type output port or not;

a fourth generation module configured to, if there exists a connection line to the data type output port, generate a corresponding splicing code according to an input port of a downstream node connected to the data type output port of the current node.

According to one or more embodiments of the present disclosure, the script generation apparatus provided in the present disclosure may further include:

a second detection module configured to detect whether the language for the splicing code matches that for the script code pre-written for each node, and a convserion module configured to, if not, convert the splicing code into a code language matching the script code pre-written for each node.

According to one or more embodiments of the present disclosure, the present disclosure provides an electronic device including:

a processor;

a memory for storing instructions executable by the processor:

The processor is used for reading the executable instruction from the memory and executing the instructions to realize the script generation method according to any embodiment provided by the present disclosure.

According to one or more embodiments of the present disclosure, the present disclosure provides a computer-readable storage medium storing a computer program for executing the script generation method according to any one of the embodiments provided by the present disclosure.

Embodiments of the present disclosure also provide a computer program, which includes program codes that, when executed by a computer, cause the computer to realize the script generation method according to any embodiment provided by the present disclosure.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

What is claimed is:

1. A script generation method, comprising the following operations that are executable by one or more processors:

in response to a triggering operation on multiple pieces of node information for implementing a target function, displaying each node corresponding to each node information on a visual panel, wherein the target function comprises a function for a face recognition business, and the node corresponds to a script code related to the target function;

in response to a triggering operation on connection lines between ports of the nodes based on an execution logic of the target function, generating a connection diagram of nodes for implementing the target function;

based on connection lines among node ports in the connection diagram of nodes, generating splicing codes representing call relationships among the nodes;

generating a target script file corresponding to the target function based on the splicing codes and the script code pre-written for each node, wherein in response to the triggering operation on multiple pieces of node information for implementing the target function, displaying each node corresponding to each node information on the visual panel, comprises at least one of:

searching a plurality of pre-created names of nodes for implementing the target function, and in respondence to a triggering operation on each node name, displaying each node corresponding to each node name on the visual panel, or, searching extensible data types of a current display node on the visual panel, and in respondence to a triggering operation on a target data type in the extensible data types, switching the current display node to a node matching the target data type, wherein before in response to a triggering operation on multiple pieces of node information for implementing a target function, displaying each node corresponding to each node information on a visual panel, the method further comprises:

acquiring a script code corresponding to a business function;

creating a node corresponding to the script code for displaying on the visual panel, wherein the node comprises at least one of a node name, at least one input port, or at least one output port.

2. The method of claim 1 wherein, the at least one input port comprises at least one of a data type input port or a control type input port;

the at least one output port comprises at least one of a data type output port or a control type output port.

3. The method of claim 2, wherein two nodes with a connection relationship therebtween comprise a first node and a second node, wherein, a data type output port on the first node is of a data type consistent with that of a data type input port to be connected on the second node;

one data type output port on the first node is connected to one or more data type input ports on the second node, and one data type input port on the second node is connected to one data type output port on the first node;

one control type output port on the first node is connected to one control type input port on the second node, and one control type input port on the second node is connected to one or more control type output ports on the first node.

4. The method of claim 1, wherein the based on connection lines among node ports in the connection diagram of nodes, generating a splicing code representing call relationships among the nodes, comprises:

performing topological sorting for the connection diagram of nodes, and sequentially traversing and detecting the port type of each node in the connection diagram of nodes based on the sorting result;

generating the splicing code representing the call relationships among the nodes based on the port types and corresponding connection conditions.

5. The method of claim 4, wherein the generating the splicing code representing the call relationships among the nodes based on the port types and corresponding connection conditions, comprises:

in response to a current node contains a data type input port, detecting whether there exists a connection line to the data type input port or not;

in response to there exists a connection line to the data type input port, generating a corresponding splicing code according to an output port of an upstream node connected to the data type input port of the current node;

in response to there does not exist a connection line to the data type input port, generating a corresponding splicing code according to an input value by the user at the data type input port of the current node.

6. The method of claim 5, further comprising:

in response to the current node contains a control type output port, detecting whether there exists a connection line to the data type output port or not;

in response to there exists a connection line to the data type output port, generating a corresponding splicing code according to an input port of a downstream node connected to the data type output port of the current node.

7. The method of claim 1, before the generating a target script file corresponding to the target function based on the splicing code and a script code pre-written for each node, further comprises:

detecting whether the splicing code matches the language of the script code pre-written for each node;

in response to not match, converting the splicing code into a code language matching the script code pre-written for each node.

8. An electronic device comprising:

a processor;

a memory for storing instructions executable by the processor;

the processor is used for reading the executable instructions from the memory and executing the instructions to implement:

in response to a triggering operation on multiple pieces of node information for implementing a target function, displaying each node corresponding to each node information on a visual panel, wherein the target function comprises a function for a face recognition business, and the node corresponds to a script code related to the target function;

in response to a triggering operation on connection lines between ports of the nodes based on an execution logic of the target function, generating a connection diagram of nodes for implementing the target function;

based on connection lines among node ports in the connection diagram of nodes, generating splicing codes representing call relationships among the nodes;

generating a target script file corresponding to the target function based on the splicing codes and the script code pre-written for each node, wherein in response to the triggering operation on multiple pieces of node information for implementing the target function, displaying each node corresponding to each node information on the visual panel, comprises at least one of:

searching a plurality of pre-created names of nodes for implementing the target function, and in respondence to a triggering operation on each node name, displaying each node corresponding to each node name on the visual panel, or, searching extensible data types of a current display node on the visual panel, and in respondence to a triggering operation on a target data type in the extensible data types, switching the current display node to a node matching the target data type, wherein the processor is used for reading the executable instructions from the memory and executing the instructions to, before in response to a triggering operation on multiple pieces of node information for implementing a target function, displaying each node corresponding to each node information on a visual panel, further implement:

acquiring a script code corresponding to a business function;

creating a node corresponding to the script code for displaying on the visual panel, wherein the node comprises at least one of a node name, at least one input port, or at least one output port.

9. The electronic device of claim 8, wherein the based on connection lines among node ports in the connection diagram of nodes, generating a splicing code representing call relationships among the nodes, comprises:

performing topological sorting for the connection diagram of nodes, and sequentially traversing and detecting the port type of each node in the connection diagram of nodes based on the sorting result;

generating the splicing code representing the call relationships among the nodes based on the port types and corresponding connection conditions.

10. The electronic device of claim 9, wherein the generating the splicing code representing the call relationships among the nodes based on the port types and corresponding connection conditions, comprises:

in response to a current node contains a data type input port, detecting whether there exists a connection line to the data type input port or not;

in response to there exists a connection line to the data type input port, generating a corresponding splicing code according to an output port of an upstream node connected to the data type input port of the current node;

in response to there does not exist a connection line to the data type input port, generating a corresponding splicing code according to an input value by the user at the data type input port of the current node.

11. The electronic device of claim 10, wherein the processor is used for reading the executable instructions from the memory and executing the instructions to further implement:

in response to the current node contains a control type output port, detecting whether there exists a connection line to the data type output port or not;

in response to there exists a connection line to the data type output port, generating a corresponding splicing code according to an input port of a downstream node connected to the data type output port of the current node.

12. The electronic device of claim 8, wherein the processor is used for reading the executable instructions from the memory and executing the instructions to further implement:

before the generating a target script file corresponding to the target function based on the splicing code and a script code pre-written for each node, detecting whether the splicing code matches the language of the script code pre-written for each node;

in response to not match, converting the splicing code into a code language matching the script code pre-written for each node.

13. A non-transitory computer-readable storage medium storing a computer program, which is executed by a processor to cause the processor to implement the following:

in response to a triggering operation on multiple pieces of node information for implementing a target function, displaying each node corresponding to each node information on a visual panel, wherein the target function comprises a function for a face recognition business, and the node corresponds to a script code related to the target function;

in response to a triggering operation on connection lines between ports of the nodes based on an execution logic of the target function, generating a connection diagram of nodes for implementing the target function;

based on connection lines among node ports in the connection diagram of nodes, generating splicing codes representing call relationships among the nodes;

generating a target script file corresponding to the target function based on the splicing codes and the script code pre-written for each node, wherein in response to the triggering operation on multiple pieces of node information for implementing the target function, displaying each node corresponding to each node information on the visual panel, comprises at least one of:

searching a plurality of pre-created names of nodes for implementing the target function, and in respondence to a triggering operation on each node name, displaying each node corresponding to each node name on the visual panel, or, searching extensible data types of a current display node on the visual panel, and in respondence to a triggering operation on a target data type in the extensible data types, switching the current display node to a node matching the target data type, wherein the computer program is executed by a processor to cause the processor to, before in response to a triggering operation on multiple pieces of node information for implementing a target function, displaying each node corresponding to each node information on a visual panel, further implement:

acquiring a script code corresponding to a business function;

creating a node corresponding to the script code for displaying on the visual panel, wherein the node comprises at least one of a node name, at least one input port, or at least one output port.

14. The non-transitory computer-readable storage medium of claim 13, wherein the based on connection lines among node ports in the connection diagram of nodes, generating a splicing code representing call relationships among the nodes, comprises:

performing topological sorting for the connection diagram of nodes, and sequentially traversing and detecting the port type of each node in the connection diagram of nodes based on the sorting result;

generating the splicing code representing the call relationships among the nodes based on the port types and corresponding connection conditions.

* * * * *